(12) United States Patent
Yi et al.

(10) Patent No.: US 10,185,772 B2
(45) Date of Patent: Jan. 22, 2019

(54) QUERY SELECTION METHOD AND SYSTEM

(71) Applicant: Hithink Royalflush Information Network Co., Ltd., Hangzhou (CN)

(72) Inventors: Zheng Yi, Hangzhou (CN); Wei Xia, Hangzhou (CN); Zhiwei Tao, Hangzhou (CN)

(73) Assignee: HITHINK ROYALFLUSH INFORMATION NETWORK CO., LTD., Zhejiang (CN)

( * ) Notice: Subject to any disclaimer, the term of this patent is extended or adjusted under 35 U.S.C. 154(b) by 304 days.

(21) Appl. No.: 14/787,472

(22) PCT Filed: Jun. 24, 2014

(86) PCT No.: PCT/CN2014/080619
§ 371 (c)(1),
(2) Date: Oct. 28, 2015

(87) PCT Pub. No.: WO2014/177118
PCT Pub. Date: Nov. 6, 2014

(65) Prior Publication Data
US 2016/0078135 A1    Mar. 17, 2016

(30) Foreign Application Priority Data

Apr. 28, 2013    (CN) .......................... 2013 1 0155688

(51) Int. Cl.
*G06F 17/30*    (2006.01)
(52) U.S. Cl.
CPC .... *G06F 17/30867* (2013.01); *G06F 17/3053* (2013.01); *G06F 17/30327* (2013.01); *G06F 17/30654* (2013.01)

(58) Field of Classification Search
CPC ......... G06F 17/30654; G06F 17/30327; G06F 17/3053; G06F 17/30867
See application file for complete search history.

(56) References Cited

U.S. PATENT DOCUMENTS

| 8,301,438 | B2 | 10/2012 | Ferrucci et al. |
| 2006/0224566 | A1 | 10/2006 | Flowers et al. |

(Continued)

FOREIGN PATENT DOCUMENTS

| CN | 1521661 A | 8/2004 |
| CN | 1691013 A | 11/2005 |

(Continued)

OTHER PUBLICATIONS

International Search Report in PCT/CN2014/080619 dated Sep. 24, 2014, 7 pages.

(Continued)

*Primary Examiner* — Cheryl Lewis
(74) *Attorney, Agent, or Firm* — Metis IP LLC (57) ABSTRACT

A system and method for query selection are provided. The method may include acquiring a natural language sentence, pre-processing to obtain a standard node sequence, constructing a node tree based on the relationship between an index node and other nodes, generating a data query command based on the node tree, querying data using the data query command, and filtering the results. The standard node sequence may include at least an index node and a condition node. The node tree may be used to characterize the index-condition combination. The system may include an acquisition unit, a pre-processing unit, a node tree construction unit, a translation unit, and a querying and filtering unit.

13 Claims, 10 Drawing Sheets

(56) References Cited

U.S. PATENT DOCUMENTS

| | | | |
|---|---|---|---|
| 2008/0263019 A1 | 10/2008 | Harrison et al. | |
| 2009/0112835 A1 | 4/2009 | Elder | |
| 2010/0257512 A1* | 10/2010 | Ortscheid | G06F 8/33 717/131 |
| 2011/0078554 A1* | 3/2011 | Nie | G06F 17/278 715/234 |
| 2012/0136649 A1 | 5/2012 | Freising et al. | |
| 2013/0080472 A1 | 3/2013 | Cohen et al. | |

FOREIGN PATENT DOCUMENTS

| | | | |
|---|---|---|---|
| CN | 101079051 A | 11/2007 | |
| CN | 101510221 A | 8/2009 | |
| CN | 101930428 A | 12/2010 | |
| CN | 102262634 A | 11/2011 | |
| CN | 102779163 A | 11/2012 | |
| CN | 103092979 A | 5/2013 | |
| CN | 103226606 A | 7/2013 | |
| CN | 103530415 A | 1/2014 | |
| TW | 432298 B | 5/2001 | |

OTHER PUBLICATIONS

Written Opinion of the International Searching Authority for PCT/CN2014/080619 dated Sep. 24, 2014, 13 pages.
First office action for Chinese application No. 201310155688.6 dated Aug. 7, 2015, 16 pages.

\* cited by examiner

QUERY SELECTION METHOD AND SYSTEM

CROSS-REFERENCE TO RELATED APPLICATIONS

The present application is a U.S. National Stage entry under 35 U.S.C. § 371 of International Application No. PCT/CN2014/080619, filed on Jun. 24, 2014, designating the United States of America and published in Chinese on Nov. 6, 2014, which in turn claims priority to Chinese Application No. 201310155688.6, filed on Apr. 28, 2013, each of which is hereby incorporated by reference in its entirety.

FIELD OF THE INVENTION

The present invention relates generally to process technology and, more specifically, to a method and system for query selection.

BACKGROUND OF THE INVENTION

When querying data from a database or other sources of data, a user is typically provided with several query options (or referred to as query indexes or indexes) by systems currently in existence, and after a user chooses a certain index, the systems currently in existence collocate restrictions according to the index, combine all the restrictions based on a logic relationship of "and" or "or," generate query instructions, query and filter data from the database, and display the filtered result to the user. In such systems, the user may be unable to query and filter data by providing a natural language sentence.

SUMMARY OF THE INVENTION

Accordingly, in one embodiment of the present invention, a query selection method and system is provided in order to solve the above-identified problem.

To achieve the objective mentioned above, one embodiment of the present invention provides the following technical solutions:

A query selection method, at least based on a query selection system, including:

the query selection system obtaining a natural language sentence provided by a user;

the query selection system pre-processing the natural language sentence provided by the user, obtaining a standard node sequence, wherein the node may include at least an index node and a condition node, wherein the condition node may include at least one of a number node, a date node, or a character string node;

the query selection system constructing a node tree according to a relationship between the index node and other nodes, wherein the node tree may represent a combination of an index node and a condition node;

the query selection system generating a data query command according to the node tree;

the query selection system querying data based on the data query command, filtering query results, and obtaining a filtered result; and the query selection system displaying the filtered results.

A query selection system, including:

an acquisition unit configured to acquire a natural language sentence provided by a user;

a pre-processing unit configured to pre-process the natural sentence provided by the user, and obtain a standard node sequence, wherein the node may include at least an index node and a condition node, wherein the condition node may further include at least one of a number node, a date node, or a character string node;

a node tree construction unit configured to construct a node tree according to a relationship between the index node and other nodes, wherein the node tree may be configured to represent an index-condition combination;

a translation unit configured to translate the node tree into a data query command;

a querying and filtering unit configured to query data based on the data query command, and filter query results to obtain a filtered result; and a display unit configured to display the filtered result.

According to the technical solutions described above, in one embodiment of the present invention, after a user provides a natural language sentence, the query selection system may process the natural language sentence automatically, construct a node tree representing an index-condition combination, generate a data query command according to the node tree, query results in the database, filter the results and display the filtered result to the user, and thus implementing querying and filtering data by providing a natural language sentence. Besides, the user may provide a natural language sentence without choosing indexes or collocating restrictions, and therefore the operations of the user may be simplified and the user operation time may be reduced.

DESCRIPTION OF THE DRAWINGS

In order to illustrate the technical solutions in connection with the embodiments of the present invention or prior art more explicitly, drawings that may be used in the description of the embodiments or prior art are simply illustrated below. Obviously, drawings described below are only some embodiments of the present invention. A person with ordinary skill in the art, and without further inventive work, may apply other drawings to the provided drawings.

DETAILED DESCRIPTION

The technical solutions of the embodiments of the present invention will be described clearly and completely in connection with the accompanying drawings. Obviously, the embodiments described herein are only part of some embodiments of the present invention and not all of them. All other embodiments obtained by a person with ordinary skill in the art based on the embodiments of the present disclosure without further inventive work are within the scope of protection of the present invention.

When querying data from a database or a data source, a user is typically provided with several query options (or referred to as query indexes or indexes) by systems currently in existence, and after the user chooses a certain index, collocates restrictions according to the index, and combines all the restrictions based on logic relationship of "and" or "or," the system currently in existence may generate query instructions, query and filter data from the database, and display to the user.

For example, if a user wants to search for students whose math scores and Chinese scores are both above 80, the user may need to choose at least two indexes of "math score" and "Chinese score," set two restrictions of ">80," and combine the two restrictions based on an "and" logical relationship. The system may then generate a query command, query and filter data from the database or data sources, and display.

Therefore, the user may be unable to query and filter data by providing a natural language sentence using existing technologies found in the prior art.

Accordingly, embodiments of the present invention provide a query selection process and system in order to solve the above problems.

Figure 1:
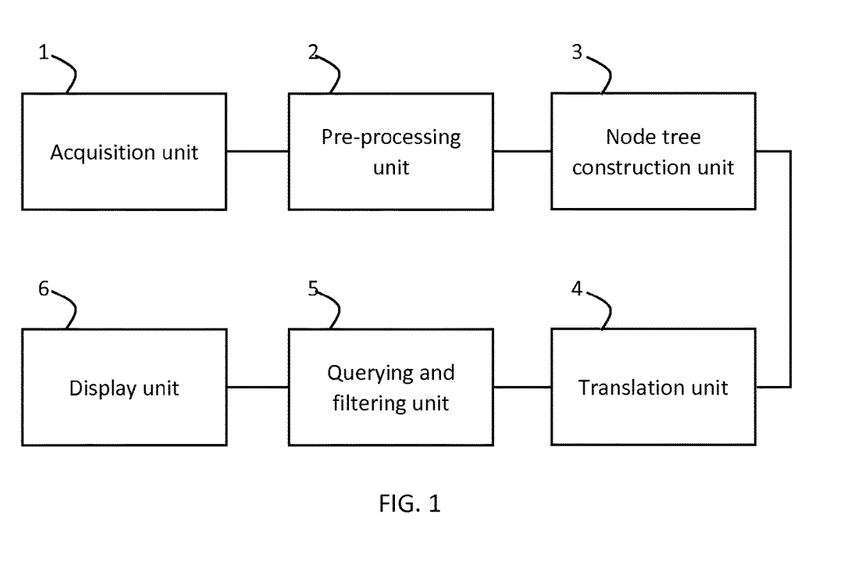
FIG. 1 is a schematic view of the structure of the query selection system according to some embodiments of the present invention.

Referring to FIG. 1, the query selection system mentioned above may include at least an acquisition unit 1, a pre-processing unit 2, a node tree construction unit 3, a translation unit 4, a querying and filtering unit 5, and a display unit 6.

Figure 2:
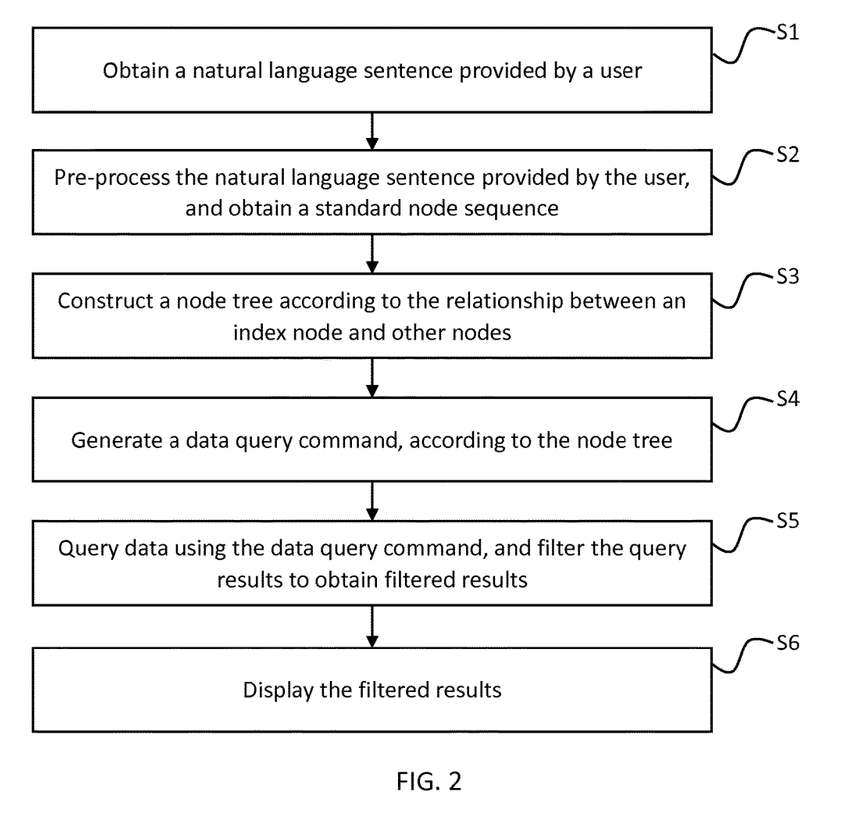
FIG. 2 is a flowchart of a process for the query selection according to some embodiments of the present invention.

Based on the query selection system mentioned above, referring to FIG. 2, a process for query selection according to some embodiments of the present invention includes at least the following steps:

S1, the query selection system (the acquisition unit) acquiring a natural language sentence provided by a user;

A user may provide the natural language sentence by a handwriting input, a keyboard input, or a voice input. Therefore, the acquisition unit mentioned above may include a keyboard, a microphone (for voice input), a stylus, and a touch-screen (the stylus and the touch-screen may be configured for handwriting input), etc.

S2, the query selection system (the pre-processing unit) pre-processing the natural language sentence provided by the user and obtaining a standard node sequence (considering there are other standard node sequences mentioned later, the standard node sequence obtained in step S2 may be referred to as a first standard node sequence).

The nodes mentioned above may include at least an index node and a condition node, and the condition node may include at least one of the following: a number node, a date node, or a character string node.

S3, the query selection system (the node tree construction unit) constructing a node tree based on the relationship between the index node and other nodes, wherein the node tree may be configured to represent an index-condition combination;

S4, the query selection system (the translation unit) generating a data query command according to the node tree;

S5, the query selection system (the querying and filtering unit) querying data based on the data query command, and filtering the query result to obtain a filtered result;

S6, the query selection system (display unit) displaying the filtered results. Specifically, the display unit may be a display screen.

According to the technical solutions described above, in some embodiments of the present invention, after a user provides a natural language sentence, the query selection system may automatically process the natural language sentence, construct a node tree representing an index-condition combination, generate a data query command according to the node tree, query and filter data from the database, and display a result to the user, thereby querying and filtering data based on a natural language sentence provided by the user. Besides, the user may provide a natural language sentence without choosing an index or collocating a restriction, resulting in a simplification for user operations and hence, a reduction of user operation time.

Steps S2 to S4 are illustrated in greater detail below.

Figure 3:
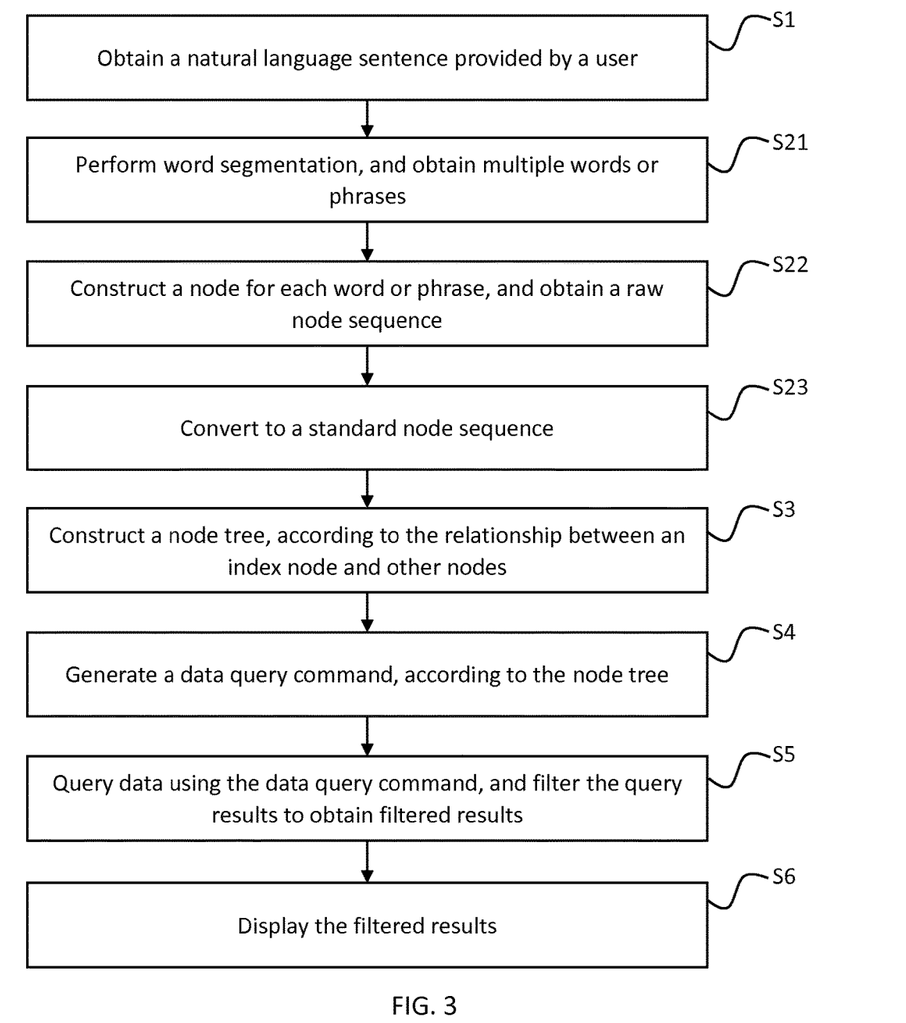
FIG. 3 is a flowchart of a process for the query selection according to some embodiments of the present invention.

First, the S2 step is illustrated. Referring to FIG. 3, in some embodiments of the present invention, the S2 step may include:

S21, performing word segmentation with respect to a natural language sentence provided by the user and obtaining multiple words or phrases;

S22, constructing a node for each word or phrase, and obtaining raw node sequences corresponding to the natural language sentence provided by user;

The raw node sequence may include at least one node.

More specifically, nodes corresponding to each word or phrase may be constructed by utilizing a configuration dictionary; the types of nodes may include a question word node, an index node, a number node, a date node, a logic word node, a character string node, etc. and a semantic node sequence corresponding to the sentence provided by the user may be obtained.

Either the number node or the character string node may be a restriction for an index node. For example, in "the math score of Ming Li in room five, the 3rd grade," "Ming Li" may be a character string node, which may be a restriction of the index node "name"; while in "math score above 90," "above 90" may be a number node as a restriction for the index node "math score."

When the number node and the date node are configured, it may first be recognized that a phrase includes a number, it may then be determined whether this number is a date; if so, the number may be constructed as a date node; otherwise it may be constructed as a number node.

It shall be noted that the query options (namely query indexes) a particular system (namely under certain scenarios) may provide may be fixed. For example, in a student grade query system, the indexes it may provide including grade, class, subjects (such as math, Chinese, geography, history, biology, and so on), etc., may be fixed. Therefore, the index key words may be used to match the words and phrases obtained from word segmentation, and thus to identify indexes included in the sentence provided by the user.

For example, using index key words such as math, Chinese, geography, history, biology, etc., from "subjects" index, to match the sentence "the students in room five, the 3rd grade whose math score is over 90 points and Chinese score is over 80 points," the system may determine that the sentence includes two indexes "math" and "Chinese."

Similarly, the logic words may be fixed; a logic word dictionary may be pre-determined, which may include key logic words such as "as well as," "and," "moreover," "meanwhile," "with," "or," etc., and then the logic key words may be used to match the words and phrases obtained from word segmentation, and thus the system may determine whether there are logic relationship nodes.

S23, converting the raw node sequence to a standard node sequence (which may be processed by the following node tree construction unit);

Because a user may provide an arbitrary natural language sentence, the corresponding node sequence may be unstandardized. In the previous example, "the math score of Ming Li in room five," there is the phrase "Ming Li" without the word "name," where the corresponding node sequence may include a character string node "Ming Li," and may lack a corresponding index node "name." Therefore, the index node "name" may need to be appended in order for a standard node sequence to be generated as in "the math score of name Ming Li in room five, the 3rd grade."

More specifically, the node sequences corresponding to a natural language sentence provided by a user may be converted to a standard node sequence that may be processed by the node tree construction unit according to the configuration rules:

First, whether the phrasing of the raw node sequence is standard is determined by examining key words and matching the characteristics of specific phrasing, the detected non-standard phrasings are converted to semantic node sequences corresponding to standard phrasings according to the conversion rules set by the configuration files. The key words may be expressed using regular expression.

For example, if a user inputs "it rains for 3 consecutive days", the regular expression "for * consecutive days" may be used to match and convert phrasing, converting "it rains for 3 consecutive days" to standard phrasings "it rains today, it rained yesterday and it rained the day before yesterday."

Meanwhile, "rain" is a character string node of the condition nodes, it may correspond to the index node "weather", therefore, the index node "weather" needs to be appended. Finally, the standard phrasing is converted as "the weather today is rain, the weather yesterday was rain and the weather the day before yesterday was rain."

It should be noted that if the user uses voice input to provide a sentence, the above step S2 may also include a step of speech recognition to convert voice input into text and to obtain a text result, thus converting voice into text.

After obtaining a standard node sequence, the following step S3 may include constructing a node tree according to the relationship between the index node and other nodes.

Figure 4:
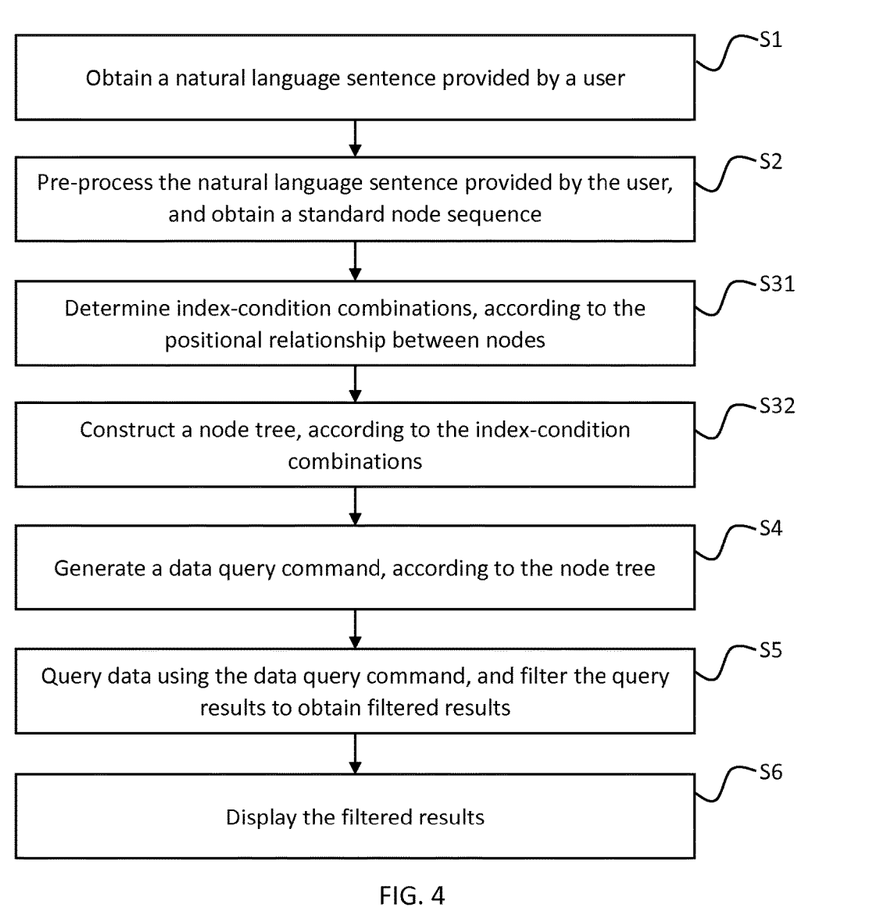
FIG. 4 is a flowchart of a process of the query selection according to some embodiments of the present invention.

According to FIG. 4, Step S3 may further include the following:

S31, determining index-condition combinations, according to the positional relationship between nodes.

For example, in "the students in class five, the 3rd grade whose math score is over 90 points and Chinese score is over 80 points," "math grade" is an index node, "over 90 points" is a number node (condition node), and with respect to the positional relationship, "math grade" and "over 90 points" are next to each other. Given the positional relationship of the two, it may be determined that "over 90 points" is a restriction of the index node "math grade," that is, "over 90 points" is a condition node of the index node "math grade."

It should be noted that, "over 90 points" is not a precise value range comprehensible by a computer. Therefore, the number node "over 90 points" needs to be processed, and converted to a number node ">90." On the other hand, if a number node already includes a precise value range, for example, a user provides a sentence "room five, the 3rd grade, with a math grade >90," the number node may not need to be processed.

More specifically, when being processed, words or phrases such as "over," "larger," and "higher" may be converted into an symbolic expression such as ">"; similarly, words or phrases such as "below," "smaller," and "lower" may be converted into "<"; words or phrases such as "no larger than," "smaller than or equal to," "no more than," and "no higher than" may be converted into "≤"; words or phrases such as "no smaller than," "larger than or equal to," "no less than," and "no lower than" may be converted into "≥."

Similarly, if a date node does not contain a precise date range comprehensible by a computer, the date node may need to be converted. Otherwise, conversion is not needed. For example, "this year" is not a precise date range comprehensible by a computer, and if this year is year 2013, it may need to be converted to a date node"2013."

Correspondingly, a logic word node may also need to be converted. For example, logic word nodes "also," "together with," "as well as," "in the meantime," and "in addition," etc., may be converted to "and" or "&"; and logic word nodes "either," and "otherwise" may be converted to "or."

An index-condition combination may be eventually achieved in the similar manner.

S32, constructing a node tree, according to the index-condition combinations.

Figure 5:
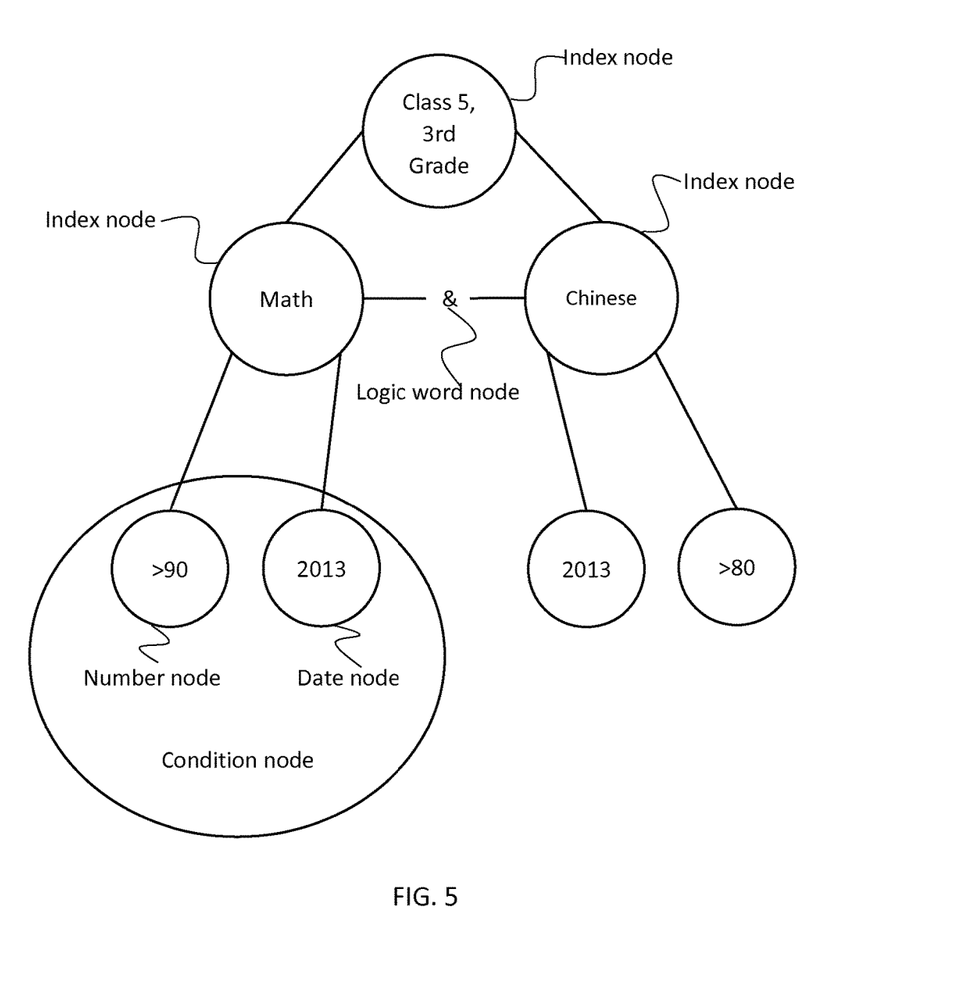
FIG. 5 is a schematic view of a node tree according to some embodiments of the present invention.

A node tree corresponding to "in year 2013, the students in room five, the 3rd grade whose math score is over 90 points and Chinese score is over 80 points" may refer to FIG. 5.

Additionally, it should be noted that every index node may have a corresponding condition node in a node tree. For example, "a stock with year over year (YOY) growth rates over 50% for three consecutive years" may include three index-condition combinations:

1) YOY growth rate in the most recent year (assuming year 2013)>50%;

2) YOY growth rate in last year (year 2012)>50%;

3) YOY growth rate in the year before last year (year 2011)>50%.

Figure 6:
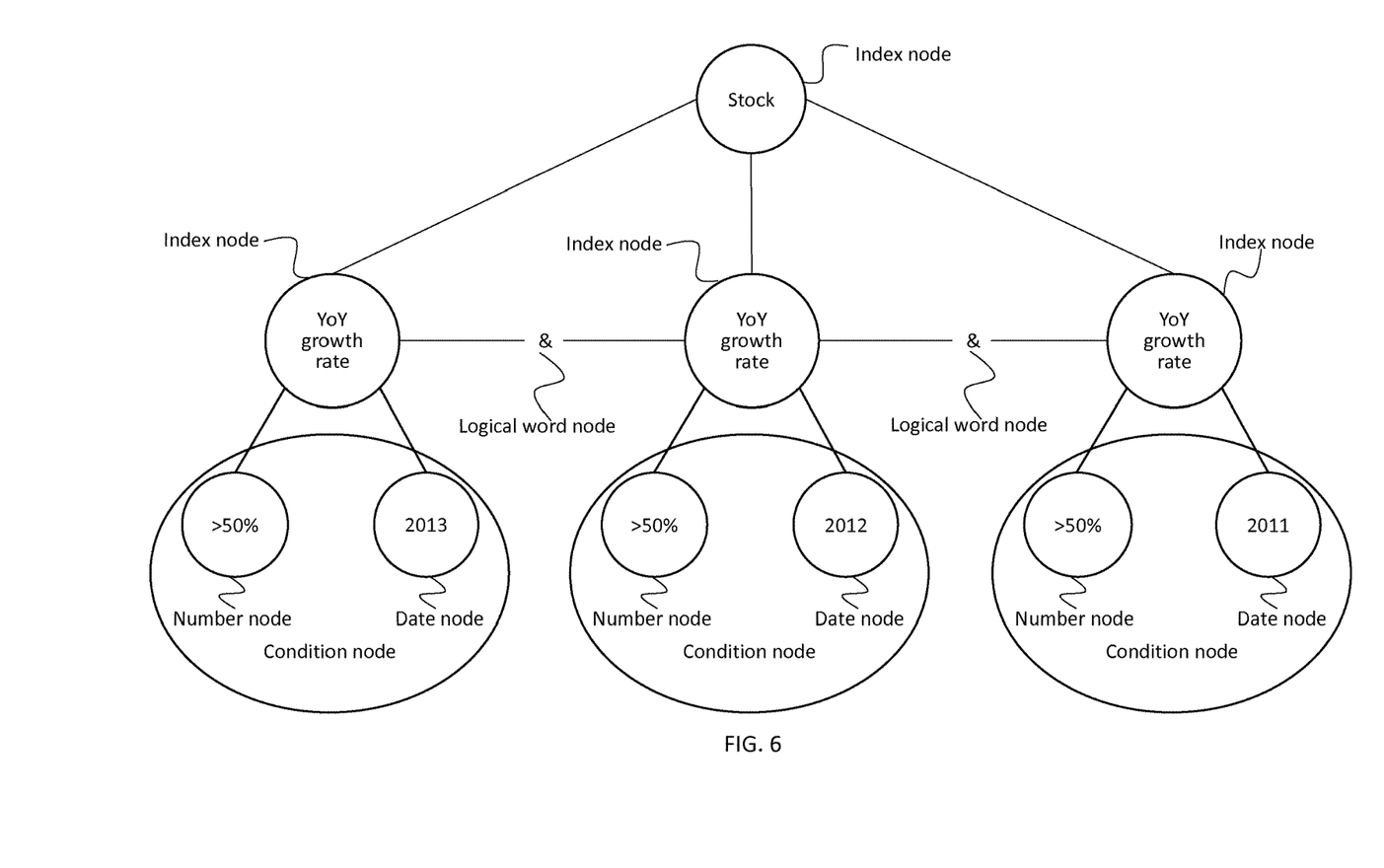
FIG. 6 is a schematic view of a node tree according to some embodiments of the present invention.

Therefore, according to FIG. 6, a node tree representing "a stock with year over year (YOY) growth rates over 50% for three consecutive years" may include three index nodes of "YOY growth rate," and each of the index nodes may correspond to a condition node.

Correspondingly, step S4 as described above may include:

determining a data source corresponding to an index node in the node tree; and translating the index node and a relevant condition node into a query command that may be consistent with the format requirement of the data source.

The reason for the above steps may be that data corresponding to different indexes may be stored in different data sources or databases and the supported format of the query command in various data sources may be different. Therefore, different formats of query commands may need to be translated based on the data sources.

Although the format query commands may be different, querying based on index-condition combinations may be applicable in every data sources. The present disclosure may utilize this characteristics and configure a command translation program for each data source based on its specific query command format. The translation program may be queried based on the index nodes and the condition nodes. Additionally, in an embodiment of the present disclosure, the sematic comprehension of sentence provided by a user and the acquisition of final data may be separated processes.

Correspondingly, filtering of the query results in Step S5 described above may include:

Combining and/or filtering a query result, according to the relationship between index nodes in the node tree.

Specifically, after obtaining query results, the results may be combined and filtered according to the logical relationship between indexes, and those satisfying all the combinations of index nodes and condition nodes may be reserved.

As an example of filtering, as demonstrated in the node tree in FIG. 6 and described above, the node tree illustrated in FIG. 6 representing "a stock with year over year (YOY) growth rates over 50% for three consecutive years" may include three index nodes of "YOY growth rate," and each of the index nodes may correspond to a condition node.

According to the query command, three types of query results may be obtained: the first type, stocks with YOY growth rate in the most recent year (assuming year 2013) >50%;

the second type, stocks with YOY growth rate in last year (year 2012)>50%;

the third type, stocks with YOY growth rate in the year before last year (year 2011)>50%.

According to the node tree in FIG. 6, the three index nodes may be connected by an "and" logic relationship, and based on this relationship, three types of query results mentioned above may be combined and filtered to generate stocks simultaneously satisfying YOY growth rate in 2013>50%, YOY growth rate in 2012>50%, and YOY growth rate in 2011>50%.

Moreover, it should be noted that, in the example of "a stock with year over year (YOY) growth rates over 50% for three consecutive years," the corresponding node tree may include three index nodes "YOY growth rate." when generating query commands, three query commands may be generated corresponding to the three index nodes, and the results may then be generated and filtered Alternatively, a single query command may be generated to search for data that satisfies the conditions in all three indexes. In this case, it may be unnecessary to perform data filtering on query results.

With respect to combination, it mainly refers to the situation that indexes correspond to different data sources, and the query results may be combined after being obtained from a plurality of data sources.

Figure 7:
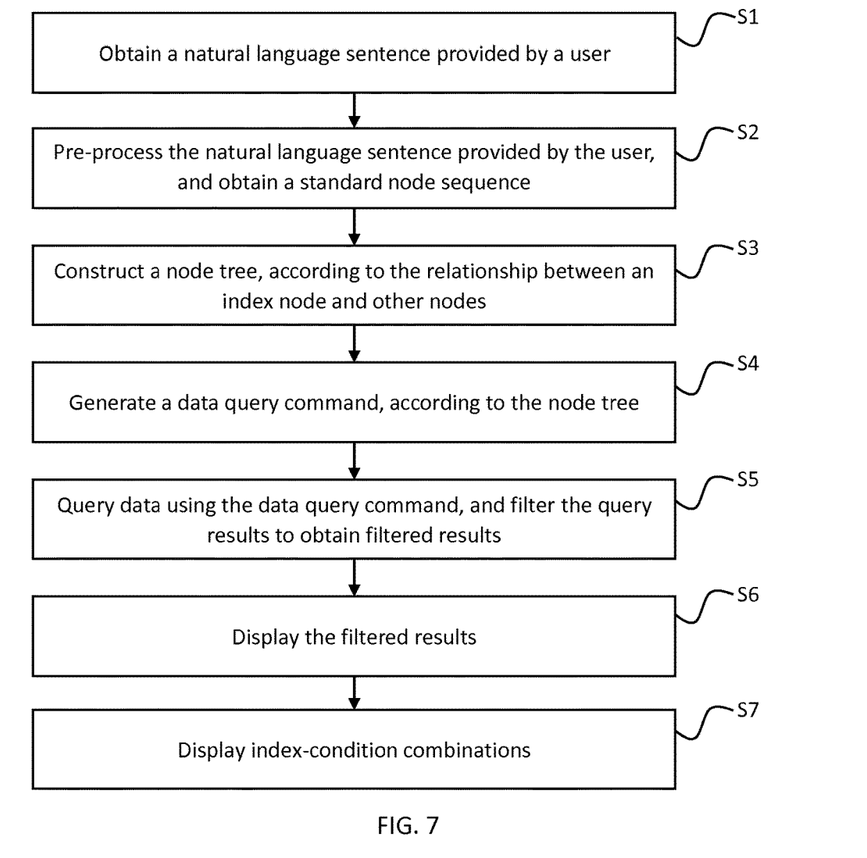
FIG. 7 is a flowchart of a process for query selection according to some embodiments of the present invention.

Referring to FIG. 7, other embodiments of the present invention, after step S6, may further include following steps:

S7, the query selection system displaying index-condition combination.

Considering that a user may change indexes for a plurality of various reasons, in other embodiments of the present invention, the method described above may also include following steps:

query selection system obtains condition changing command provided by a user; and after obtaining a condition changing command, the system may change conditions and regenerate data query command.

Correspondingly, the query selection system can may include a command-changing unit to obtain condition changing command provided by a user to change conditions accordingly and regenerate data query command.

Specifically, condition changing may further include condition appending, condition amending, and condition deleting.

With respect to condition appending, a user may use a method similar to the known art to choose the indexes that need to be appended and configure restrictions corresponding to those indexes. The user may also append natural language conditions.

A button or icon may be set up so that command changing unit may be activated when the user click it.

Figure 8:
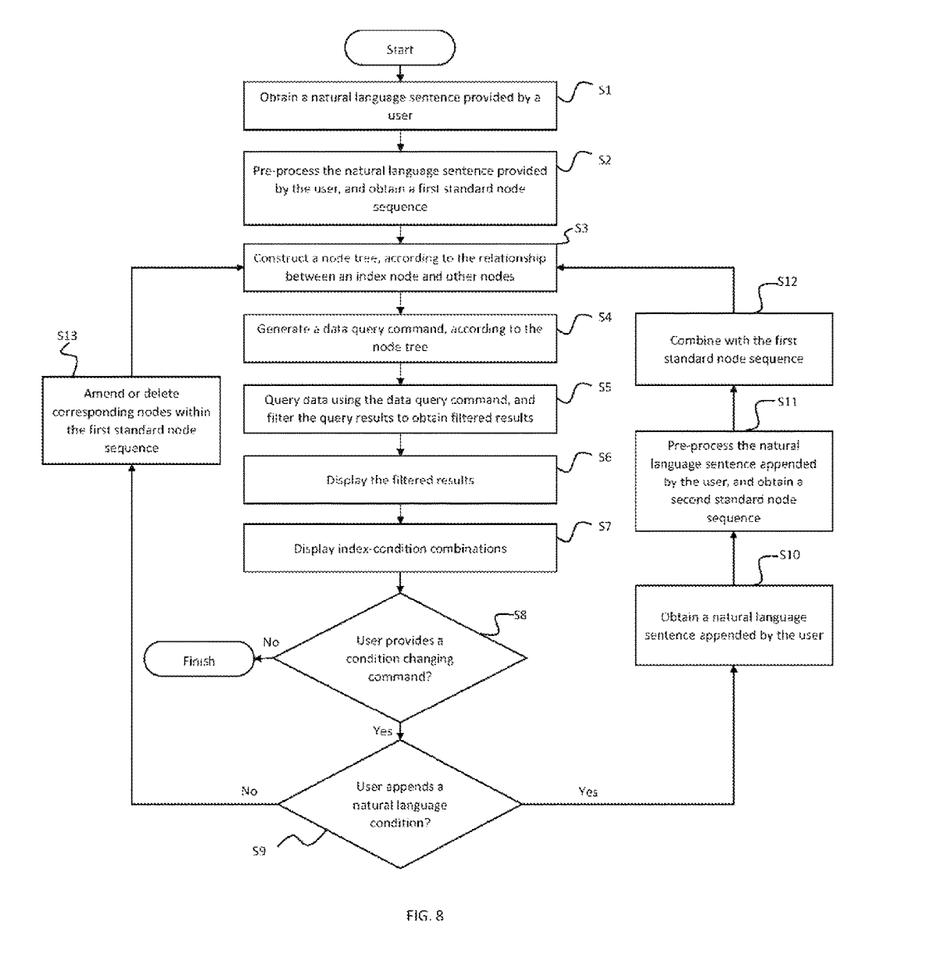
FIG. 8 is a flowchart of a process for query selection according to some embodiments of the present invention.

More specifically, referring to FIG. 8, if a user chooses to append conditions in natural language, then the natural language sentence appended by the user may be obtained (S10) (similar to S1), the appended natural language sentence may then be pre-processed to obtain a second standard node sequence (S11)(similar to S2), the second standard node sequence may be combined with the first standard node sequence to generate a new first standard node sequence, the query command may be regenerated (S3) and querying and filtering in step S4 may be proceeded to, depending on the query command.

However, if a user wishes to change only the conditions corresponding to some indexes, or delete only some conditions or indexes, the corresponding nodes of the first standard node sequence may be changed or deleted directly (S13) and step S3 may be further proceeded to.

For a specific implementation, after step S7, the query selection system may provide buttons "condition appending," "condition changing" and "condition deleting" simultaneously to facilitate user's operations.

Figure 9:
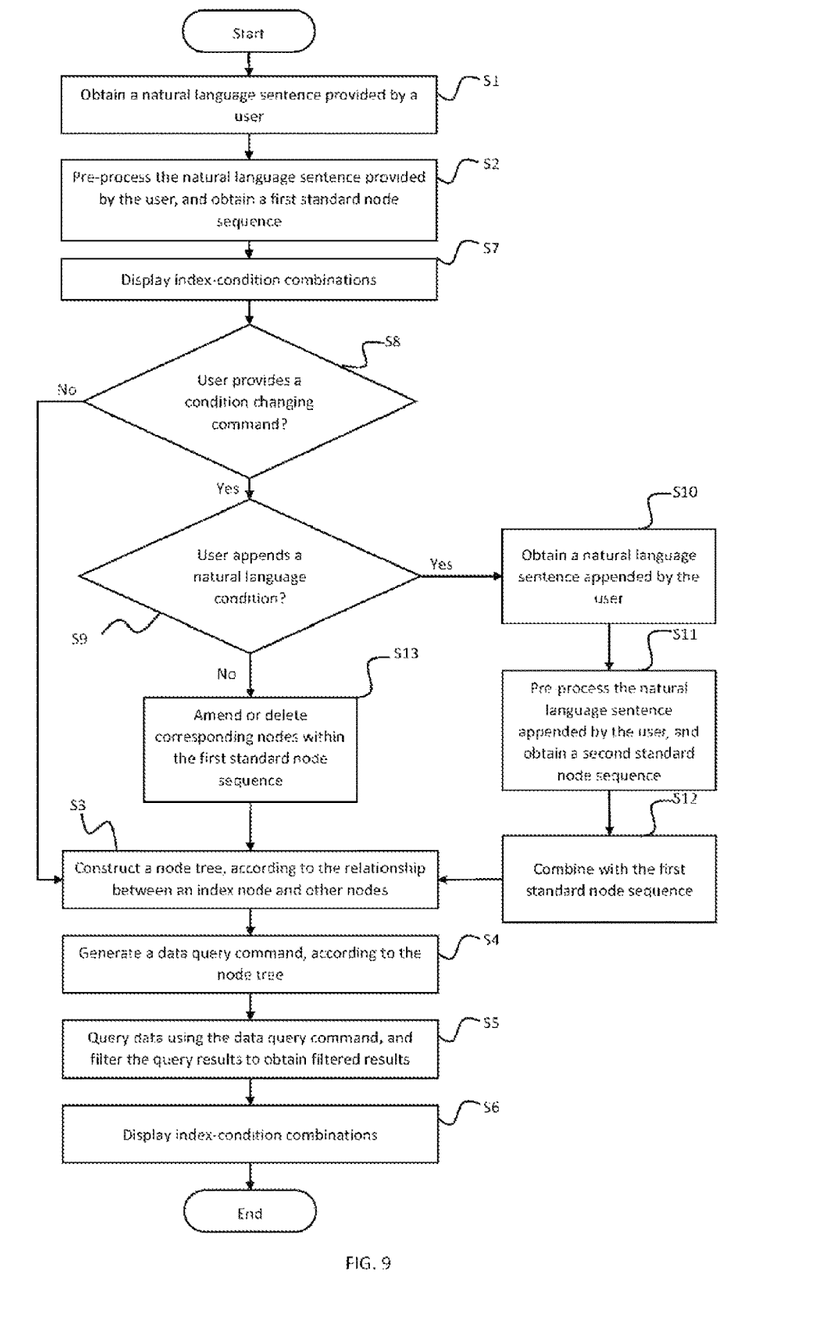
FIG. 9 is a flowchart of the query selection method according to some embodiments of the present invention.

Besides, it should be noted that step S7 described above may be implemented before S3 (shown in FIG. 9), and the time a user chooses to change a condition may also be before the implementation of S3.

Figure 10:
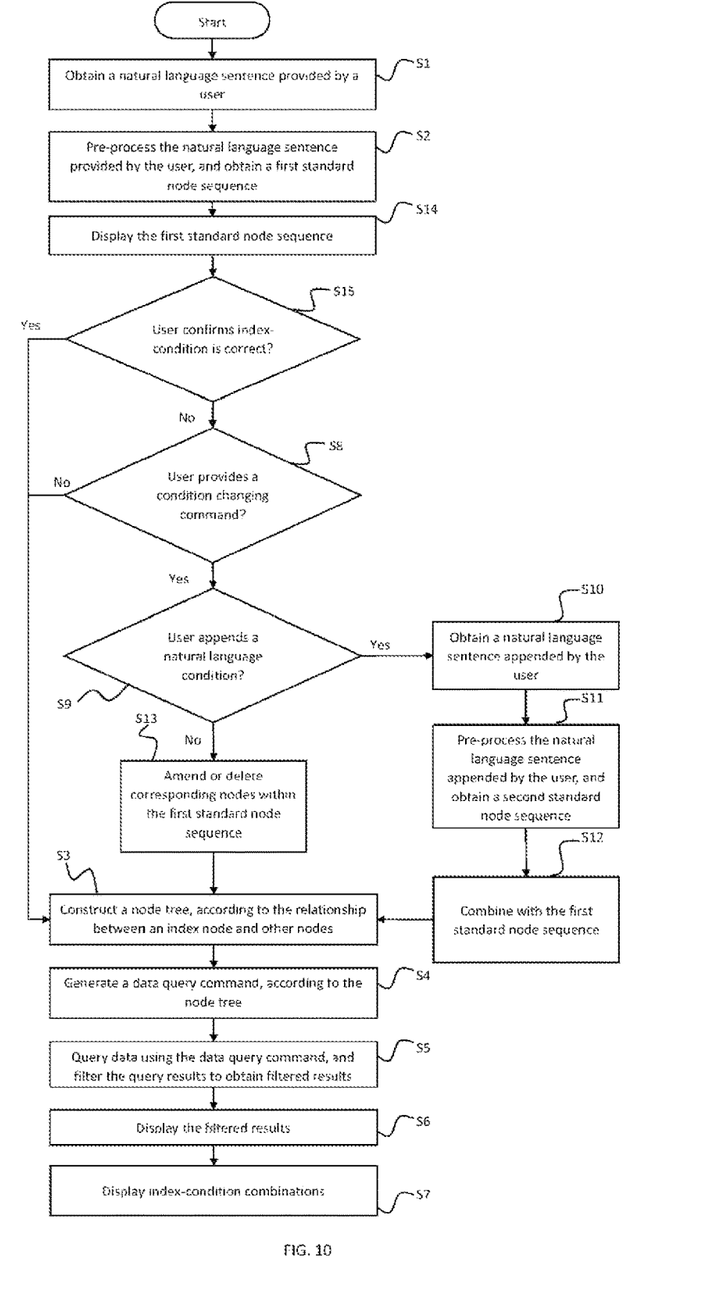
FIG. 10 is a flowchart of the query selection method according to some embodiments of the present invention.

Else, referring to FIG. 10, after step S2, the following steps may be included:

S14, displaying the first standard node sequence so that the user may acquire the system's "comprehension" of the index-condition combination;

For example, if a user inputs "the math score of Ming Li in class five, the 3rd grade," then it may converted to a first standard node sequence"Grade3rd Class Five Name Ming Li Subject math score" and displayed.

S15, determining whether the user confirms the correctness of the index condition.

A confirm button may be provided for a user. If the user confirms the correctness, S3 may be performed.

If the user confirms the incorrectness in index condition, then a condition changing command may be provided and condition appending, condition amending or condition deleting may be performed, which is not further discussed here.

For a specific implementation, after performing step S14, the query selection system may provide buttons "confirm," "condition appending," "condition amending" and "condition deleting" to facilitate user's operations.

The implementation process of the present invention may be described below via an example of "stocks with net profit increasing at over 50% for 3 consecutive years."

Step (1), a user may provide a natural language sentence "stocks with net profit increasing at over 50% for 3 consecutive years."

Step (2), a raw node sequence "stocks |with net profit |increasing| at over 50%| for 3 consecutive years," may be obtained, where "|" is used to separate nodes.

In this step, it can be made clear that stocks are to be searched. The characteristics of "net profit" and "increasing" provided by the configuration files may be used to convert the nonstandard phrasing in the raw node sequence to a standard phrasing "stocks |with year over year (YOY) growth over 50%| for 3 consecutive years."

Step (3), number node and time node may be analyzed.

In this embodiment, "over 50%" may be converted to ">50%," and "for 3 consecutive years" may be converted to a specific time scope expanding from the most recent year to the previous two years.

Step (4), a node tree may be constructed.

First, the number node ">50%" may be bound to the index "net profit (with year over year (YOY) growth)" as a filtering condition and the time node "for 3 consecutive years" may be bound to it as a time parameter;

Because the characteristic of the time parameter bound to "net profit (with year over year (YOY) growth)" is annual, "3 consecutive years" may be divided into three annual time nodes "the most recent year," "last year" and "the year before last year," and other nodes may be copied, finally a node tree representing three index conditions may be obtained (referring to FIG. 6).

It should be noted that when this stock selection demand is processed by a traditional stock selection tool, the user may typically be asked to choose the index "net profit (with year over year (YOY) growth)" three times separately, choose the year corresponding to each index and set a restriction "index over 50%" for each year, thus the operation may be complicated. However, the embodiment of the present invention only requires a user to provide a natural language sentence, which significantly simplifies the user's operations.

Step (5), the index-condition combinations above may be translated to a data query command.

First, the data source corresponding to the index "net profit (with year over year (YOY) growth)," may be determined, 3 index-condition combinations described above may then be translated to a supported query command according to the data source's format requirement on the query command.

Step (6), the query demand may be executed, and condition "net profit (with year over year (YOY) growth)>50%" may be used to filter out stocks which don't satisfy the condition.

Step (7), queried stocks and the corresponding net profit (with year over year (YOY) growth) may be displayed on an interface, and the obtained index-condition combination may also be presented to a user to check and examine.

Step (8), a user may choose to change conditions (i.e. to input a condition changing command as described above), such as appending a condition "Zhejiang Province," in order to obtain "stocks having net profit increase over 50% for 3 consecutive years" within "Zhejiang Province." Alternatively, a user may change ">50%" in "net profit (with year over year (YOY) growth) in the most recent year>50%" to "<30%," and reselect the stocks.

If the user do not further change conditions, the process may normally end.

It should be noted that the technical solutions provided by the embodiments of the present invention may be used infields of searching, communication, industry, etc. A brief example in each field will be described below:

In the field of searching, when a user provides a natural language sentence on a website, the website server (namely query selection system) may perform steps S1 to S4, and convert the natural language sentence provided by the user to data query commands. The website server may then use data query commands to query the results, then filter the results (Step S5) and return and display filtered results on the client side, thus completing a search.

In the field of communication, for example, when a user inputs "call Ming Li," the cellphone (namely the query selection system) may, after performing steps S1 and S2, convert natural sentence provided by the user to a standard node sequence "call contact Ming Li," where "contact" is an index node, and "Ming Li" is a character string node. In steps S3, S4 and S5, data command may be generated, contacts in the cellphone may be queried, and the phone number of "Ming Li" may be acquired and displayed. Thereafter, the method described above may further include giving a phone call (to "Ming Li") according to the query result of "Ming Li's" phone number.

In the field of industrial control (such as steelmaking), if a user inputs "maintain the temperature at 50 degree," the PLC (namely the query selection system) may, after performing steps S1 and S2, recognize an index node "temperature" and a number node "50 degree". In steps S3, S4, S5 and S6, PLC may generate data command, query the current temperature of the steelmaking product line and displays it (the steelmaking product line may regularly uploads it current temperature to a database). The method described above may further include comparing the current temperature of the steelmaking product line with "50 degrees." If the former value is lower than the latter one, the temperature may be increased; otherwise, if the former value is higher than the latter one, the temperature may be decreased.

Accordingly, a query selection system may be within the scope of protection of the present invention, referring again to FIG. 1, this system may at least include:

an acquisition unit 1, configured to acquire a natural language sentence provided by a user;

a pre-processing unit 2, configured to pre-process the natural sentence provided by the user, and obtain a first standard node sequence, wherein the node may include at least an index node and a condition node, wherein the condition node may further include at least one of a number node, a date node, or a character string node;

a node tree construction unit 3, configured to construct a node tree, according to the relationship between the index node and other nodes, wherein the node tree is configured to represent an index-condition combination;

a translation unit 4, configured to translate the node tree into a data query command;

a querying and filtering unit 5, configured to query data according to the data query command, and filter query result to obtain a filtered result; and a display unit 6, configured to display the filtered result.

The display unit 6 may also be used to display index-condition combinations.

For specific details, please refer to the descriptions in the previous part of this disclosure and they are not further discussed here.

In other embodiments of the present invention, the query selection system described above may also include a changing unit to obtain condition changing command provided by a user and change conditions accordingly.

More specifically, the changing unit may further include condition appending unit and condition amending/deleting unit.

When a user provides appended a natural language sentence, the condition appending unit may obtain the appended natural language sentence provided by the user, pre-process them to obtain second standard node sequences, combine the second standard node sequences with the first standard node sequences, and then, instruct the node tree construction unit 3 to regenerate a data query demand.

The condition amending/deleting unit may amend or delete the corresponding nodes of the first standard node sequence according to user's operations of amending or deleting and then instruct the node tree construction unit 3 to regenerate data query command.

For specific details, please refer to the descriptions in the previous part of this disclosure and they are not further discussed here.

At last, it should be noted that the preprocess unit, the node tree construction unit, the translation unit, the filtering unit and command changing unit in this query selection system, may be hardware unit, electric circuit or logic unit. When these units are logic units, their respective functions may be completed by a processor.

The embodiments in this disclosure are described progressively. That is, each embodiment describes the parts that are different from other embodiments, and the same or similar parts may be applicable among various embodiments.

The steps of methods or algorithm described in the disclosed embodiments may be implemented by hardware, software blocks executed by processors, or any combination thereof. The software blocks may be placed in random access memory (RAM), read-only memory (ROM), electrically programmable ROM, electrically erasable programmable ROM, register, hard disk, removable disk, CD-ROM or any other types of storage medium known in the technical field.

This description is intended to be illustrative for those skilled in the art to realize and implement present invention. Thus, many alternatives, modifications, and variations will be apparent to those skilled in the art. The features, structures, methods, and other characteristics of the exemplary embodiments described herein may be realized in other embodiments without departing from the spirit and scope of the present invention. Therefore, the present invention is not limited to the embodiments described above but the broadest range which is consistent with the disclosed method and the inventive characteristics in present disclosure.

The invention claimed is:

1. A query selection method specifically for querying data from one or more databases, implemented on a hardware which has at least one processor and a storage device, comprising:
    obtaining, by the at least one processor, a natural sentence;
    performing, by the at least one processor, word segmentation on the natural sentence, and obtaining multiple words or phrases;
    obtaining, by the at least one processor, a raw node sequence corresponding to the natural sentence, the raw node sequence including at least one node, each node of the at least one node in the raw node sequence corresponding to a word or a phrase of the multiple words or phrases;
    determining, by the at least one processor, that the raw node sequence is non-standard by examining index key words or matching characteristics of specific phrasing;
    converting, by the at least one processor, the non-standard raw node sequence to a standard node sequence according to a conversion rule set according to a configuration file, the standard node sequence including multiple index nodes
    and at least one condition node, wherein the at least one condition node further comprises at least one of a number node, a date node, or a character string node, and wherein the multiple index nodes correspond to indexes of the one or more databases;
    constructing, by the at least one processor, a node tree according to the standard node sequence, wherein the node tree is structured to include the multiple index nodes, the at least one condition node, a first relationship between a first index node of the multiple index nodes and a second index node of the multiple index nodes, and a second relationship between at least one index node of the multiple index nodes and the at least one condition node;
    generating, by the at least one processor, a first data query command according to the node tree;
    querying, by the at least one processor, data using the first data query command from the one or more databases to obtain a query result; and
    filtering the query result based on the node tree to obtain a filtered result.

2. The method according to claim 1, further comprising, displaying the first relationship or the second relationship.

3. The method according to claim 2, further comprising:
    obtaining, by the at least one processor, a condition changing command;
    regenerating, by the at least one processor, a second data query command according to the condition changing command; and
    querying, by the at least one processor, data using the second data query command from the one or more databases.

4. The method according to claim 3, wherein the condition changing command comprises appending a condition, amending a condition, or deleting a condition.

5. The method according to claim 1, wherein the filtering of the query result further comprises: combining and/or filtering the query result according to the first relationship in the node tree.

6. The method according to claim 1, wherein the constructing a node tree further comprises:
    determining, by the at least one processor, an index-condition combination at least according to a positional relationship between nodes of the standard node sequence; and
    constructing, by the at least one processor, the node tree according to the index-condition combination.

7. The method according to claim 1, wherein the generating a first data query command according to the node tree further comprises:
    determining, by the at least one processor, from the one or more databases, a target database related to at least one index node in the node tree; and
    translating, by the at least one processor, the at least one index node and a corresponding condition node into the first query command that is consistent with a format of the target database.

8. The method according to claim 1, further comprising:
    displaying the standard node sequence on a user interface displayed on a display of a user device;
    determining, by the at least one processor, that a user confirms accuracy of the standard node sequence via a user interface feature for confirmation provided on the user interface.

9. A query selection system specifically configured to query data from one or more databases, including a storage device storing a set of instructions, and at least one processor when executing the instructions causing the system to:
    acquire a natural language sentence;
    perform word segmentation on the natural sentence to obtain multiple words or phrases;
    obtain a raw node sequence corresponding to the natural sentence, the raw node sequence including at least one node, each node of the at least one node in the raw node sequence corresponding to a word or a phrase of the multiple words or phrases;

determine that the raw node sequence is non-standard by examining index key words or matching characteristics of specific phrasing;

convert the raw node sequence to a standard node sequence according to a conversion rule set according to a configuration file, the standard node sequence including multiple index nodes and at least one condition node, wherein the at least one condition node further comprises at least one of a number node, a date node, or a character string node, and the multiple index nodes correspond to indexes of the one or more databases;

construct a node tree according to the standard node sequence, wherein the node tree is structured to include the multiple index nodes, the at least one condition node, a first relationship between a first index node of the multiple index nodes and a second index node of the multiple index nodes, and a second relationship between at least one index node of the multiple index-nodes and the at least one condition node;

translate the node tree into a first data query command;

query data using the first data query command from the one or more databases to obtain a query result; and filter the query result based on the node tree to obtain a filtered result.

10. The query selection system of claim 9, further comprising a display unit configured to display the first relationship or the second relationship.

11. The query selection system of claim 10, the at least one processor further causing the system to:

obtain a condition changing command;

regenerate a second data query command according to the condition changing command; and query data using the second data query command from the one or more databases.

12. The query selection system of claim 11, wherein the condition changing command comprises appending a condition, amending a condition, or deleting a condition.

13. A query selection method specifically for querying data from one or more databases, implemented on a hardware which has at least one processor and a storage device, comprising:

obtaining, by the at least one processor, a natural sentence;

performing, by the at least one processor, word segmentation on the natural sentence, and obtaining multiple words or phrases;

obtaining, by the at least one processor, a raw node sequence corresponding to the natural sentence, the raw node sequence including at least one node, each node of the at least one node in the raw node sequence corresponding to a word or a phrase of the multiple words or phrases;

determining, by the at least one processor, that the raw node sequence is non-standard by examining index key words or matching characteristics of specific phrasing;

converting, by the at least one processor, the non-standard raw node sequence to a standard node sequence according to a conversion rule set according to a configuration file, the standard node sequence including multiple index nodes and at least one condition node, wherein the at least one condition node further comprises at least one of a number node, a date node, or a character string node, and wherein the multiple index nodes correspond to indexes of the one or more databases;

displaying the standard node sequence on a user interface presented on a display of a user device;

determining, by the at least one processor, that a user confirms inaccuracy of the standard node sequence via at least one user interface feature provided on the user interface;

obtaining, by the at least one processor, a condition changing command provided by the user via the at least one user interface feature on the user interface;

constructing, by the at least one processor, a node tree according to the standard node sequence and the condition changing command, wherein the node tree is structured to include the multiple index nodes, the at least one condition node, a first relationship between a first index node of the multiple index nodes and a second index node of the multiple index nodes, and a second relationship between at least one index node of the multiple index nodes and the at least one condition node;

generating, by the at least one processor, a data query command according to the node tree;

querying, by the at least one processor, data using the data query command from the one or more databases to obtain a query result; and filtering the query result based on the node tree to obtain a filtered result.

* * * * *